United States Patent [19]

Owaki et al.

[11] Patent Number: 4,591,927
[45] Date of Patent: May 27, 1986

[54] MAGNETIC TAPE HAVING MULTIPLE TRACKS AND RECORDING APPARATUS THEREFOR

[75] Inventors: Isao Owaki, Tokyo; Susumu Saito, Sagamihara, both of Japan

[73] Assignee: Victor Company of Japan, Ltd., Yokahama, Japan

[21] Appl. No.: 558,152

[22] Filed: Dec. 5, 1983

[30] Foreign Application Priority Data

Dec. 9, 1982 [JP] Japan .................. 57-216189

[51] Int. Cl.$^4$ .............................. G11B 5/86
[52] U.S. Cl. ................................ 360/15
[58] Field of Search .................. 360/15, 16, 17, 65, 360/39

[56] References Cited

U.S. PATENT DOCUMENTS

| | | | |
|---|---|---|---|
| 3,298,006 | 1/1967 | Milenkovic | 360/15 |
| 3,315,242 | 4/1967 | Haddad | 360/17 |
| 3,677,554 | 7/1972 | Smith et al. | 360/15 |
| 4,101,938 | 7/1978 | Hanai | 360/16 |

FOREIGN PATENT DOCUMENTS 3120448  3/1982  Fed. Rep. of Germany ........ 360/39

*Primary Examiner*—Vincent P. Canney
*Attorney, Agent, or Firm*—Ladas & Parry

[57] ABSTRACT

A magnetic tape is simultaneously recorded with digital signals on one or a plurality of forward recording tracks and reverse recording tracks thereon as the tape travels in a predetermined direction. The digital signals are reproduced from the forward recording tracks when the tape travels in a direction from one end to another end thereof, and the digital signals are reproduced from the reverse recording tracks when the tape travels in a direction from the other end to the one end thereof. The digital signals are recorded with the phase of the digital signals which are recorded on the forward or reverse recording tracks, relatively advanced with respect to the phase of the digital signals which are recorded on the reverse or forward recording tracks, so that solitary reproduced waveforms which are reproduced from the forward and reverse recording tracks respectively have substantially the same assymmetry of zeros or the same symmetry of zeros. The first recording tracks are scanned upon reproduction in a direction opposite to the predetermined direction in which the tape traveled upon recording, and the second recording tracks are scanned upon reproduction in a direction which is the same as the predetermined direction in which the tape traveled upon recording.

5 Claims, 16 Drawing Figures

TAPE TRAVELING DIRECTION

MAGNETIC TAPE HAVING MULTIPLE TRACKS AND RECORDING APPARATUS THEREFOR

BACKGROUND OF THE INVENTION

The present invention generally relates to magnetic tapes having multiple tracks which are recorded with digital signals and recording apparatus therefor, and more particularly to a magnetic tape which is recorded with digital signals which are reproduced from a master tape, where the master tape is recorded with the digital signals in an optimum state on one or a plurality of forward recording tracks which are scanned when the master tape travels in a forward direction during a normal reproducing mode and on one or a plurality of reverse recording tracks which are scanned when the master tape travels in a reverse direction during the normal reproducing mode, and a recording apparatus therefor. The magnetic tape according to the present invention is recorded with the digital signals which are reproduced from both the forward and reverse tracks on the master tape as the master tape travels in one direction, so that the forward and reverse tracks are simultaneously formed on the magnetic tape.

When recording analog information signals such as audio and video signals as digital signals, the analog information signals are subjected to a digital pulse modulation so as to obtain a digital data sequence. A synchronizing signal, error detecting codes, error correcting codes, and the like are added to this digital data sequence, to constitute a digital signal of one frame. The digital signals are recorded onto a magnetic tape by stationary heads in terms of frames. Conventionally, when carrying out the recording of the digital signals in the manner described above, one or a plurality of forward recording tracks are formed as the magnetic tape (particularly a cassette tape) travels in one direction. When the forward recording tracks are formed up to one end of the magnetic tape, the magnetic tape is turned over in order to form one or a plurality of reverse recording tracks as the magnetic tape travels in the above one direction. The reverse recording tracks are formed up to the other end of the magnetic tape. Further, the reverse recording tracks are formed at locations which are different from the locations of the forward recording tracks. On the other hand, when the above pre-recorded magnetic tape is played, the recorded digital signals are reproduced from the forward recording tracks or the reverse recording tracks, while the magnetic tape travels similarly as in the case during the recording.

Conventionally, when producing the pre-recorded magnetic tape (such as a pre-recorded music cassette tape), a master tape is first prepared. Desired digital signals are then recorded in an optimum state on the forward recording tracks and the reverse recording tracks on this master tape. In a high-speed reproducing apparatus, the master tape is driven to travel in one direction at a tape speed which is eight times the tape speed which is employed during the normal (original) recording and reproducing modes, for example. Thus, the digital signals are simultaneously reproduced from n forward recording tracks (n is a natural number greater than or equal to one) and n reverse recording tracks, in the high-speed reproducing apparatus. The digital signals which are simultaneously reproduced in parallel from 2n tracks, are supplied to a high-speed recording apparatus. In the high-speed recording apparatus, a magnetic tape (slave tape) is driven to travel in one direction at a high tape speed which is identical to the high tape speed employed in the high-speed reproducing apparatus, and the reproduced digital signals from the high-speed reproducing apparatus are simultaneously recorded onto n forward recording tracks and n reverse recording tracks on the slave tape. The slave tape can be recorded within a short period of time, because the n forward recording tracks and the n reverse recording tracks are simultaneously formed on the slave tape as the slave tape travels in one direction. Such a recording technique was advantageous, since it eliminated the need to drive the master tape in both the forward and reverse directions in order to reproduce the digital signals from the forward and reverse recording tracks, and moreover, it eliminated the need to drive the slave tape in both the forward and reverse directions in order to record the digital signals which are reproduced from the master tape. Accordingly, the production efficiency was improved by employing such a recording technique.

However, when producing the slave tape according to the above described recording technique, either the forward recording tracks or the reverse recording tracks will be formed and recorded as the slave tape travels in a direction which is opposite to the direction in which the tape travels when those tracks are scanned upon reproduction. As a result, the waveforms of the digital signals which are reproduced from the forward recording tracks, become different from the waveforms of the digital signals which are reproduced from the reverse recording tracks. Suppose that the digital signals which are reproduced from the recording tracks as the tape travels in a direction which is identical to the direction in which the tape traveled when the digital signals were recorded on the same recording tracks, have solitary waveforms. In the solitary waveform, a first time width between a peak level reproducing time when the peak level is obtained and a reproducing time when a first zero which is immediately prior to this peak level reproducing time is obtained, is generally shorter compared to a second time width between the peak level reproducing time and a reproducing time when a first zero which is immediately subsequent to the peak level reproducing time is obtained, as in the case during the recording. In the present specification, a term "assymmetry of zeros" will be used to indicate a case where the above first and second time widths are different.

Various reasons for such assymmetry of zeros in the solitary waveform, have been reported. For example, D. F. Eldridge, "Magnetic recording and reproduction og pulses", IRE trans. Audio, pp. 47–52, Aug. 8, 1960, discloses the effects of magnetization components in a vertical direction to a magnetic surface. N. Curland and D. E. Speliotis, "An iterative hysteretic model for digital magnetic recording", IEEE Trans. Magn., vol. MAG-7, no. 3, pp. 538–543, 1971, discloses the effects of assymmetry of the transition zone. Further, A. V. Davies, "The influence of some head and coating properties on pulse resolution in NRZ digital recording", In Int. Conf. Digital Recording, London, pp. 68–71, 1964, for example, discloses the effects of time lag in an electrical circuit due to eddy current and head inductance.

The digital signals which are reproduced from the magnetic tape, are supplied to an equalizer circuit in a reproducing system of a recording and reproducing apparatus. For example, the equalizer circuit compensates for a high-frequency component which was attenuated during the process of the magnetic recording and reproduction, and converts the reproduced digital signals into a predetermined signal format. The converted signals from the equalizer circuit are supplied to an automatic threshold control circuit which restores the converted signals into the original binary coded digital signals, under the control of a clock signal. Thus, by taking into consideration the recording and reproducing characteristics of the recording and reproducing apparatus, the equalizer circuit in the reproducing system of the recording and reproducing apparatus is preadjusted so that optimum solitary waveforms which have the same assymmetry of zeros as the solitary waveforms upon recording, are reproduced from the recording tracks as the magnetic tape travels in a direction which is the same as the direction in which the magnetic tape traveled when the same recording tracks were recorded.

However, the digital signals may be reproduced from the recording tracks as the magnetic tape travels in a direction which is opposite to the direction in which the magnetic tape traveled when the same recording tracks were recorded. In this case, the solitary waveforms which are reproduced from the recording tracks, do not have the same assymmetry of zeros as the solitary waveforms upon recording. In the solitary waveform obtained in this case, the assymmetry of zeros is such that a first time width between a peak level reproducing time when the peak level is obtained and a reproducing time when a first zero which is immediately prior to this peak level reproducing time is obtained, is longer compared to a second time width between the peak level reproducing time and a reproducing time when a first zero which is immediately subsequent to the peak level reproducing time is obtained.

Accordingly, when the conventional recording and reproducing apparatus played a pre-recorded magnetic tape which had been recorded with the high-speed recording technique described before, the equalizer circuit could not carry out an optimum waveform equalization while the digital signals were being reproduced from the recording tracks as the magnetic tape traveled in a direction which was opposite to the direction in which the magnetic tape traveled when the same recording tracks were recorded. As a result, the error rate of the reproduced digital signals was unsatisfactory. Moreover, when the original analog information signals were audio signals, there were problems in that discontinuities were introduced in the reproduced sounds, and noise were generated in the reproduced sounds.

SUMMARY OF THE INVENTION

Accordingly, it is a general object of the present invention to provide a novel and useful magnetic tape having multiple tracks which are recorded with digital signals, and recording apparatus therefor, in which the above described problems have been eliminated.

Another and more specific object of the present invention is to provide a magnetic tape which is recorded with digital signals on one or a plurality of forward tracks and one or a plurality of reverse tracks thereon, so that solitary waveforms of the digital signals which are reproduced from the forward recording tracks have the same assymmetry of zeros or symmetry of zeros as solitary waveforms of the digital signals which are reproduced from the reverse recording tracks, by passing the digital signals which are to be recorded on the forward recording tracks and/or the reverse recording tracks through a phase compensation circuit, and a recording apparatus therefor. According to the present invention, it is possible to constantly obtain digital signals which have been subjected to a predetermined waveform equalization in an equalizer circuit within a reproducing system of an existing recording and reproducing apparatus which plays the pre-recorded magnetic tape. Hence, it is possible to prevent an increase in the error rate of the reproduced digital signals which occurred in the case of the conventional pre-recorded magnetic tape, when the digital signals are reproduced from the recording tracks as the magnetic tape travels in a direction which is opposite to the direction in which the magnetic tape traveled when the same recording tracks were recorded. In addition, it is unnecessary to compensate for the characteristic of the zeros in the solitary waveforms on a time base during the reproducing mode by use of an equalizer circuit and the like. Consequently, there is no need to alter the circuit construction of the existing recording and reproducing apparatus.

Other objects and further features of the present invention will be apparent from the following detailed description when read in conjunction with the accompanying drawings.

DETAILED DESCRIPTION

Figure 1:
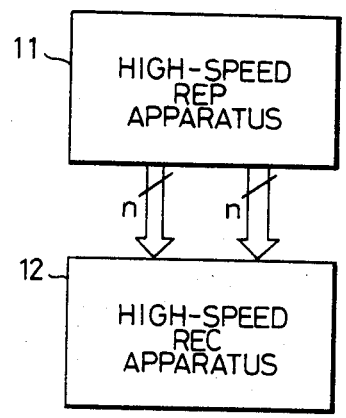
FIG. 1 is a systematic block diagram showing a general method of producing a pre-recorded magnetic tape, to which the present invention may be applied.

First, description will be given with respect to a general method of producing a pre-recorded magnetic tape, to which the present invention may be applied. In FIG. 1, a high-speed reproducing apparatus 11 is designed to reproduce recorded digital signals from a master magnetic tape. The master magnetic tape is pre-recorded with digital signals on one or a plurality of forward recording tracks and on one or a plurality of reverse recording tracks thereon, in an optimum state. The high-speed reproducing apparatus 11 simultaneously reproduces the recorded digital signals from all of the forward recording tracks and the reverse recording tracks on the master magnetic tape, while the master magnetic tape travels at a tape speed which is in the order of eight times the tape speed which is employed during original (normal) recording and reproducing modes. For example, the above digital signals may be constituted by signals which are in terms of frames and are time-sequentially multiplexed. In order to obtain such signals which are in terms of frames, a digital data sequence is first obtained by subjecting analog audio signals to a digital pulse modulation such as a pulse code modulation (PCM), for example. The signals which are in terms of frames are then obtained by adding an error detecting code, an error correcting code, and a synchronizing signal which indicates ends of each frame, after a predetermined number (greater than or equal to one) of words in the digital data sequence.

The above digital signals are recorded by a stationary magnetic head, onto n (n is a natural number greater than or equal to one) forward recording tracks along the longitudinal direction of the tape, as an unrecorded magnetic tape travels in one direction from the beginning of the tape to the terminal end of the tape. When the terminal end of the tape is reached and the recording of the forward recording tracks is completed, the magnetic tape is turned over in order to record the digital signals by the stationary head, onto n reverse recording tracks along the longitudinal direction of the tape, as the magnetic tape travels in the above one direction from the terminal end to the beginning of the tape. The master magnetic tape is recorded in this manner. Of course, the stationary head may be turned over instead of turning over the magnetic tape. In this case, the digital signals are recorded onto the n reverse recording tracks as the magnetic tape travels in a direction opposite to the above one direction from the terminal end to the beginning of the tape. The n reverse recording tracks are formed at locations which are different from the locations of the n forward recording tracks.

The digital signals are usually divided and recorded on two or more multitracks during the recording of the forward recording tracks and the recording of the reverse recording tracks, for the reasons set forth below.

Pre-recorded magnetic tapes (slave tapes) which are mass produced from the master magnetic tape, is marketed in the form of cassette tapes, for example. However, there is a limit in reducing the gaps widths of the stationary magnetic head which reproduce the digital signals from such a cassette tape, due to limitations which are introduced from the manufacturing point of view. Accordingly, the tape speed must be set to a considerably high speed in order to obtain a desired transmission rate. However, at least a recording and reproducing time of one hour is required in a tape recorder which is used to mainly record and reproduce stereo programs. Thus, if the tape speed is considerably reduced in such a tape recorder, the required recording and reproducing time cannot be made available because of the limited length of the magnetic tape which can be accommodated within the cassette tape.

Therefore, in order to make the required recording and reproducing time available by reducing the tape speed (7.14 cm/sec, for example) but obtain the desired transmission rate (1 Mb/sec to 2 Mb/sec, for example), the digital signals are divided and recorded on the multitracks during the recording of the forward recording tracks and the recording of the reverse recording tracks. Generally, the digital data sequence and the error correcting codes in the digital signals, are distributed and recorded on the n forward recording tracks (and reverse recording tracks). The synchronizing signals and the error detecting codes (cyclic redundancy check code, for example) are respectively recorded on each of the n forward recording tracks (and reverse recording tracks), with a predetermined period.

The master magnetic tape which is recorded in the optimum state as described heretofore, travels in one direction at the tape speed which is in the order of eight times the tape speed (7.14 cm/sec, for example) which is employed during original (normal) recording and reproducing modes in the high-speed reproducing apparatus 11, as described before. The digital signals which are simultaneously reproduced by the stationary magnetic heads from all of the n forward recording tracks and n reverse recording tracks, are respectively supplied to stationary magnetic heads of a high-speed recording apparatus 12. The stationary magnetic heads of the high-speed recording apparatus 12 simultaneously record the digital signals which are reproduced from the slave magnetic tape, on 2n tracks along the longitudinal direction of an unrecorded slave magnetic tape which travels in one direction at a tape speed which is equal to the high tape speed employed in the high-speed reproducing apparatus 11.

As a result, the high-speed recording apparatus 12 produces the slave magnetic tape which is a duplicate copy of the master magnetic tape. That is, the digital signals recorded on the n forward recording tracks on the master magnetic tape are copied and recorded on n forward recording tracks on the slave magnetic tape, and the digital signals recorded on the n reverse recording tracks on the master magnetic tape are copied and recorded on n reverse recording tracks on the slave magnetic tape. As described before, the slave magnetic tape travels in one direction, at a high speed, while all of the digital signals recorded on the master magnetic tape are copied. Thus, according to the system shown in FIG. 1, it is unnecessary to carry out the troublesome operation of independently copying the forward recording tracks and the reverse recording tracks on the master magnetic tape, and a large number of slave magnetic tapes can be mass produced within a short period of time.

Figure 2A:
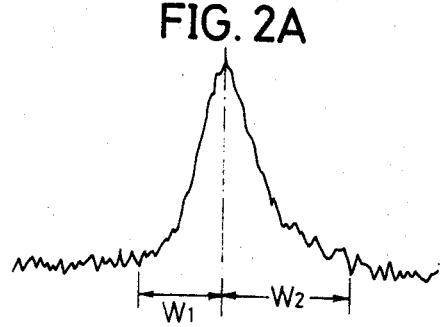
FIGS. 2A and 2B are graphs respectively showing a waveform of a signal which is reproduced from the pre-recorded magnetic tape as the tape travels in a direction which is the same as the direction in which the tape traveled upon recording, and an eye-pattern of an output signal of an equalizer circuit.

However, in the above slave magnetic tape, the forward recording tracks or the reverse recording tracks are recorded as the slave magnetic tape travels in a direction which is opposite to the direction in which the slave magnetic tape travels when the digital signals are reproduced from these forward recording tracks or the reverse recording tracks, because all of the forward and reverse recording tracks on the slave magnetic tape are recorded simultaneously. It will be assumed that solitary waveforms such as the one shown in FIG. 2A are obtained, when the digital signals are reproduced from the n forward or reverse recording tracks which were recorded as the slave magnetic tape traveled in the direction which is the same as the direction in which the slave magnetic tape travels during the reproduction of these n forward or reverse recording tracks. It is known that, in the solitary waveform shown in FIG. 2A, a first time width $W_1$ between a peak level reproducing time when the peak level is obtained and a reproducing time when a first zero which is immediately prior to this peak level reproducing time is obtained, is generally shorter compared to a second time width $W_2$ between the peak level reproducing time and a reproducing time when a first zero which is immediately subsequent to the peak level reproducing time is obtained, as in the case of the solitary waveform which is obtained upon reproduction of the master magnetic tape. In the present specification, a term "assymmetry of zeros" will be used to indicate a case where the time widths $W_1$ and $W_2$ in the solitary waveform shown in FIG. 2A are different, and a term "symmetry of zeros" will be used to indicate a case where the time widths $W_1$ and $W_2$ are the same.

Figure 3A:
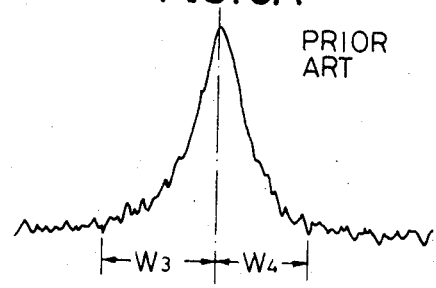
FIGS. 3A and 3B are graphs respectively showing a waveform of a signal which is reproduced from the pre-recorded magnetic tape as the tape travels in a direction which is opposite to the direction in which the tape traveled upon recording according to the prior art, and an eye-pattern of the output signal of the equalizer circuit according to the prior art.

On the other hand, solitary waveforms such as the one shown in FIG. 3A are obtained when the digital signals are reproduced from the n forward or reverse recording tracks which were recorded as the slave magnetic tape traveled in a direction opposite to the direction in which the slave magnetic tape travels during the reproduction of these n forward or reverse recording tracks. As shown in FIG. 3A, a first time width $W_3$ between a peak level reproducing time when the peak level is obtained and a reproducing time when a first zero which is immediately prior to this peak level reproducing time is obtained, is longer compared to a second time width $W_4$ between the peak level reproducing time and a reproducing time when a first zero which is immediately subsequent to the peak level reproducing time is obtained. Hence, there also is assymmetry of zeros in this case.

Figure 2B:
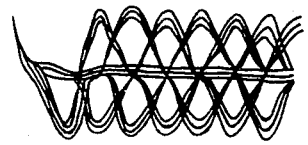

As described previously, by taking into consideration the recording and reproducing characteristics of the existing recording and reproducing apparatus, the equalizer circuit in the reproducing system of the recording and reproducing apparatus is pre-adjusted so that optimum reproduction is achieved when the digital signals are reproduced from the recording tracks as the slave magnetic tape travels in a direction which is the same as the direction in which the slave magnetic tape traveled when the same recording tracks were recorded. When the reproduced solitary waveform shown in FIG. 2A is supplied to the equalizer circuit, the eye-pattern of the output signal of the equalizer circuit assumes an optimum eye-pattern shown in FIG. 2B. This optimum eye-pattern shown in FIG. 2B is the waveform which can be observed when the output signal of the equalizer circuit is monitored on an oscilloscope, and the horizontal axis indicates the time and the vertical axis indicates the voltage. As is well known, the voltage at each point in time assumes various values according to the value of the digital data. However, because the voltage is converted into the decimal level "1" or "0" at points in time which correspond to each bit, there will exist a range in which the voltage waveform will not pass.

Figure 3B:
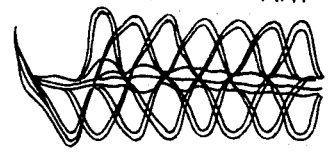

On the other hand, the solitary waveforms which are reproduced from the recording tracks as the slave magnetic tape travels in a direction which is opposite to the direction in which the slave magnetic tape traveled when the same recording tracks were recorded, become different from the solitary waveforms upon recording, as described previously. The solitary waveforms which are reproduced in this case, becomes as the solitary waveform shown in FIG. 3A. When this solitary waveform shown in FIG. 3A is supplied to the equalizer circuit, the output signal of the equalizer circuit assumes an eye-pattern shown in FIG. 3B. As may be easily seen by comparing FIGS. 2B and 3B, the eye-pattern of the output signal of the equalizer circuit which is obtained in this case, is quite different from the optimum eye-pattern. Accordingly, in the present invention, a phase compensation circuit is employed so that substantially the same solitary waveforms can be reproduced from the forward and reverse recording tracks on the slave magnetic tape, as will be described later on in the specification. The magnetic tape according to the present invention is a tape such as the slave magnetic tape, and the recording apparatus according to the present invention is an apparatus which may be applied to the high-speed reproducing apparatus 12.

Figure 4:
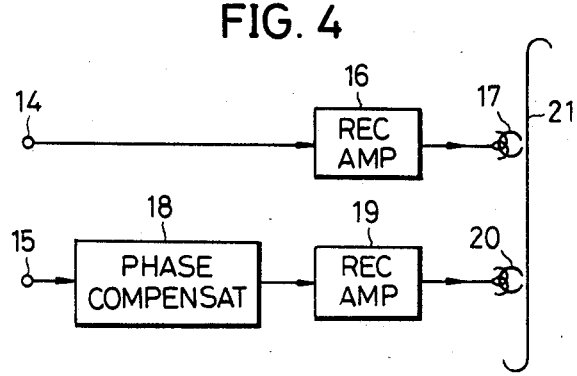
FIG. 4 is a systematic block diagram showing an embodiment of a recording apparatus according to the present invention.

In FIG. 4, the digital signals which are to be recorded on the forward recording tracks on the slave magnetic tape, are applied to an input terminal 14. On the other hand, the digital signals which are to be recorded on the reverse recording tracks on the slave magnetic tape, are applied to an input terminal 15. The digital signals which are applied to these input terminals 14 and 15, are the digital signals which are simultaneously reproduced from all of the forward and reverse recording tracks on the master magnetic tape as the master magnetic tape travels in one direction, for example.

The digital signals which are applied to the input terminal 14 with a bit rate of 1.042 Mb/sec, for example, are supplied to a stationary magnetic head 17 through a recording amplifier 16. On the other hand, the digital signal which are applied to the input terminal 15 with a bit rate of 1.042 Mb/sec, for example, are supplied to a phase compensation circuit 18.

Figure 5:
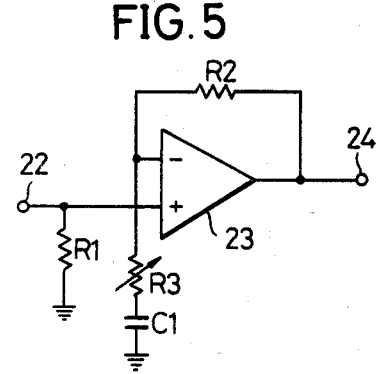
FIG. 5 is a circuit diagram showing a first embodiment of a phase compensation circuit in the block system shown in FIG. 4.

FIG. 5 is a circuit diagram showing a first embodiment of the phase compensation circuit 18. In FIG. 5, an input terminal 22 is coupled to a non-inverting input terminal of an operational amplifier 23. This non-inverting input terminal of the operational amplifier 23 is grounded through a resistor $R_1$. On the other hand, an inverting input terminal of the operational amplifier 23 is grounded through a series connection of a resistor $R_3$ and a capacitor $C_1$. The resistor $R_3$ may be a variable resistor. Further, an output terminal of the operational amplifier 23 is connected to the inverting input of the operational amplifier 23 through a resistor $R_2$ and to an output terminal 24. The phase compensation circuit 18 having the circuit construction shown in FIG. 5, has a phase versus frequency characteristic which is indicated by a curve I in FIG. 6, and an amplitude versus frequency characteristic which is indicated by a curve II in FIG. 6. Hence, the phase compensation circuit 18 advances the phase of the input digital signals, and supplies the resulting output signal to a recording amplifier 19 shown in FIG. 4 through the output terminal 24. An output signal of the recording amplifier 19 is supplied to a stationary magnetic head 20. The phase compensation circuit 18 advances the phase of the input digital signals by a maximum, at a frequency $f_c$ which is determined by $\frac{1}{2}\pi R_3 C_1$. For example, the resistor $R_2$ has a resistance of $3k\Omega$, the resistor $R_3$ has a resistance of $5k\Omega$, and the capacitor $C_1$ has a capacitance of 300 pF.

Figure 7:
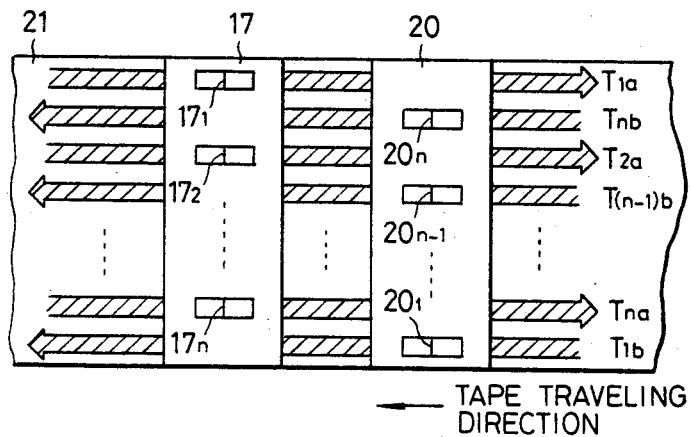
FIG. 7 shows positional relationships and the like of a track pattern formed on the magnetic tape according to the present invention and recording and reproducing heads.

As shown in FIG. 7, the magnetic head 17 comprises n head gaps $17_1$ through $17_n$, and the magnetic head 20 comprises n head gaps $20_1$ through $20_n$. The magnetic heads 17 and 20 are separated from each other by a predetermined distance along the longitudinal direction of the magnetic tape. Actually, there are n transmission paths from the input terminal 14 to the magnetic head 17, and there are n transmission paths from the input terminal 15 to the magnetic head 20. The digital signals applied to the input terminal 14, are divided and recorded by the magnetic head 17 on n forward recording tracks $T_{1a}$ through $T_{na}$ on a magnetic tape 21 which travels to the left in FIG. 7. At the same time, the digital signals applied to the input terminal 15 are divided and recorded by the magnetic head 20 on n reverse recording tracks $T_{1b}$ through $T_{nb}$ on the magnetic tape 21. The recording tracks $T_{1a}$ through $T_{na}$ and $T_{1b}$ through $T_{nb}$ are indicated by hatchings in FIG. 7. Accordingly, a total of 2n recording tracks are simultaneously formed on the magnetic tape 21. During the recording of these 2n recording tracks, the magnetic tape 21 travels to the left in FIG. 7 as indicated by an arrow. This traveling direction of the magnetic tape 21 is the same as the direction of arrows illustrated at left ends of the forward recording tracks $T_{1a}$ through $T_{na}$ in FIG. 7, which arrows indicate the direction in which the forward recording tracks $T_{1a}$ through $T_{na}$ are scanned upon reproduction. However, this traveling direction of the magnetic tape 21 is opposite to the direction of arrows illustrated at right ends of the reverse recording tracks $T_{1b}$ through $T_{nb}$ in FIG. 7, which arrows indicate the direction in which the reverse recording tracks $T_{1b}$ through $T_{nb}$ are scanned upon reproduction. The above recording of the 2n tracks, is carried out in a state where the magnetic tape 21 travels at a tape speed which is eight times the tape speed employed during a normal reproducing mode, for example. In addition, the digital signals applied to the input terminal 15, are recorded on the reverse recording tracks $T_{1b}$ through $T_{nb}$ in a time sequence which is in reverse to the time sequence with which these reverse recording tracks $T_{1b}$ through $T_{nb}$ are scanned upon reproduction. The tape pattern on the magnetic tape 21 is the same as the conventional tape pattern, however, the recorded digital signals are different from those recorded in the conventional magnetic tape.

Figure 6:
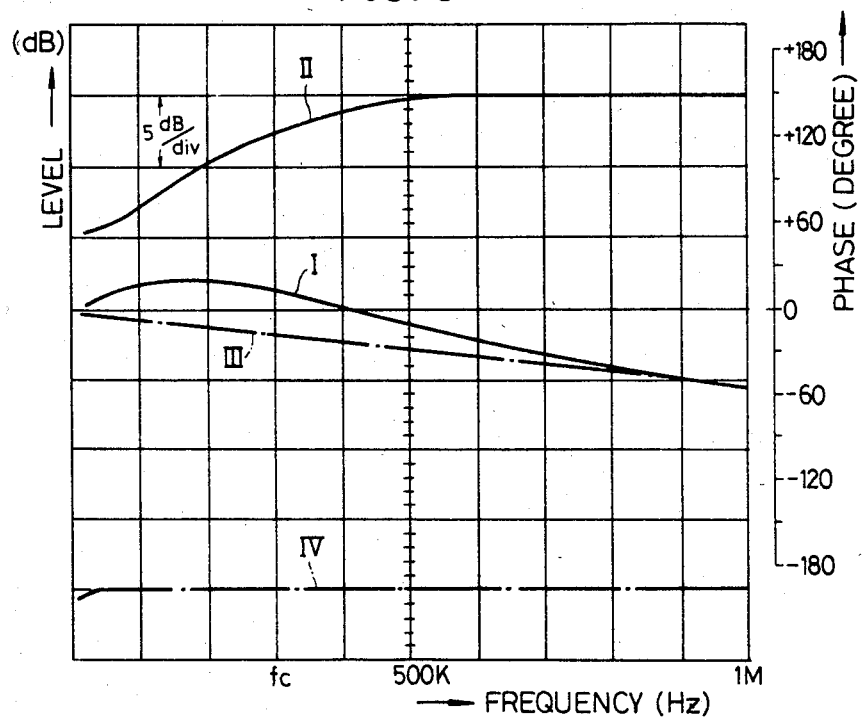
FIG. 6 is a graph showing a phase versus frequency characteristic and an amplitude versus frequency characteristic of the recording apparatus according to the present invention.
Figure 8A:
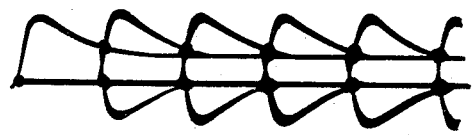
FIGS. 8A and 8B are graphs respectively showing waveforms of recording currents in the recording apparatus according to the present invention.
Figure 8B:

In other words, the digital signals which are applied to the input terminal 14 to be recorded on the forward recording tracks $T_{1a}$ through $T_{na}$, are recorded similarly as in the conventional case by passing the digital signals through a transmission system having a phase versus frequency characteristic indicated by a one-dot chain line III in FIG. 6 and a flat amplitude versus frequency characteristic indicated by a one-dot chain line IV in FIG. 6. However, the digital signals which are applied to the input terminal 15 to be recorded on the reverse recording tracks $T_{1b}$ through $T_{nb}$, is given the phase versus frequency characteristic indicated by the curve I in FIG. 6 and the amplitude versus frequency characteristic indicated by the curve II in FIG. 6, in the phase compensation circuit 18 as described before. FIG. 8A shows an example of the recording current applied to the magnetic head 20, and FIG. 8B shows an example of the recording current applied to the magnetic head 17.

Therefore, the phase of the digital signals which are recorded on the reverse recording tracks $T_{1b}$ through $T_{nb}$, becomes advanced compared to the phase of the digital signals which are recorded on the forward recording tracks $T_{1a}$ through $T_{na}$. As a result, when the solitary waveforms recorded on the reverse recording tracks $T_{1b}$ through $T_{nb}$ are reproduced, a first time width between a peak level reproducing time when the peak level is obtained and a reproducing time when a first zero which is immediately prior to this peak level reproducing time is obtained, becomes longer compared to a second time width between the peak level reproducing time and a reproducing time when a first zero which is immediately subsequent to the peak level reproducing time is obtained. The reason why the assymmetry of zeros of the solitary waves which are reproduced from the reverse recording tracks $T_{1b}$ through $T_{nb}$ in this case, becomes the same as the assymmetry of zeros of the solitary waves which are reproduced from the forward recording tracks $T_{1a}$ through $T_{na}$ if the digital signals applied to the input terminal 15 are given the phase-advance characteristic, may be readily understood from the three reasons described before.

Figure 9A:
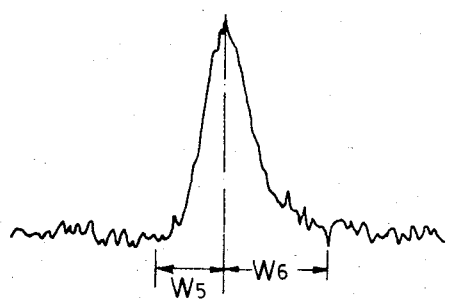
FIGS. 9A and 9B respectively show an example of a waveform of a signal which is reproduced from the pre-recorded magnetic tape as the tape travels in a direction which is opposite to the direction in which the tape traveled upon recording according to the present invention, and an example of an eye-pattern of the output signal of the equalizer circuit obtained according to the present invention.
Figure 9B:
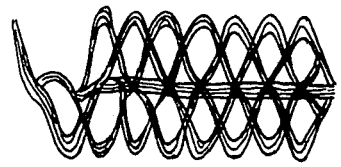

Accordingly, when the reverse recording tracks $T_{1b}$ through $T_{nb}$ are scanned during the reproducing mode as the magnetic tape 21 travels in a direction opposite to the direction in which the magnetic tape 21 traveled upon recording, the solitary waveforms such as the one shown in FIG. 9A are reproduced. In the solitary waveform shown in FIG. 9A, the assymmetry of zeros is such that a first time width $W_5$ is shorter than a second time width $W_6$. The assymmetry of zeros of the solitary waveform shown in FIG. 9A, is the same as the assymmetry of zeros of the solitary waveform shown in FIG. 2A which is reproduced when the forward recording tracks $T_{1a}$ through $T_{na}$ are scanned during the reproducing mode as the magnetic tape 21 travels in a direction which is the same as the direction in which the magnetic tape 21 traveled upon recording. Hence, the eye-pattern of the output signal of the equalizer circuit which subjects the digital signals which are reproduced from the reverse recording tracks $T_{1b}$ through $T_{nb}$ to the waveform equalization, becomes as shown in FIG. 9B. This eye-pattern shown in FIG. 9B is substantially the same as the eye-pattern shown in FIG. 2B which is obtained from the output of the equalizer circuit when the digital signals are reproduced from the forward recording tracks $T_{1a}$ through $T_{na}$.

That is, according to the present embodiment, the digital signals which are to be recorded on the reverse recording tracks are given the phase-advance characteristic upon recording, so that the assymmetry of zeros of the reproduced solitary waveforms which are reproduced from the reverse recording tracks, becomes the same as the assymmetry of zeros of the solitary waveforms which are reproduced from the forward recording tracks. As a result, the equalizer circuit can carry out the desired waveform equalization of the reproduced digital signals in the optimum state, during the scanning period in which the forward recording tracks are scanned and also during the scanning period in which the reverse recording tracks are scanned during the reproducing mode.

Figure 10:
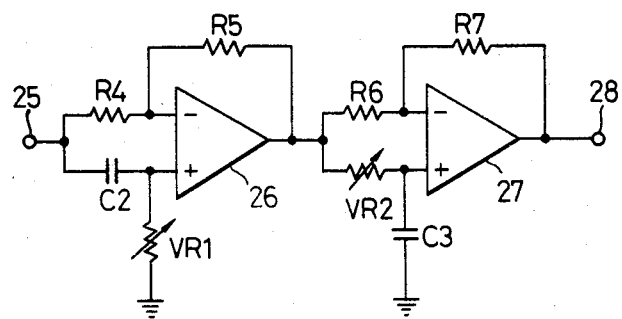
FIG. 10 is a circuit diagram showing a second embodiment of a phase compensation circuit in the recording apparatus according to the present invention.

Next, description will be given with respect to a second embodiment of the phase compensation circuit 18, by referring to FIG. 10. In FIG. 10, an input terminal 25 is coupled to an inverting input terminal of an operational amplifier 26 through a resistor $R_4$. The input terminal 25 is also coupled to a non-inverting input terminal of the operational amplifier 26 through a circuit which comprises a capacitor $C_2$ and a variable resistor $VR_1$. An output of the operational amplifier 26 is coupled to the inverting input terminal thereof, through a resistor $R_5$. Further, the output of the operational amplifier 26 is coupled to an inverting input terminal of an operational amplifier 27 through a resistor $R_6$, and to a non-inverting input terminal of the operational amplifier 27 through a circuit which comprises a variable resistor $VR_2$ and a capacitor $C_3$. An output of the operational amplifier 27 is coupled to the inverting input terminal thereof, through a feedback resistor $R_7$, and this output of the operational amplifier 27 is coupled to an output terminal 28.

In the phase compensation circuit shown in FIG. 10, the absolute value of the transfer function is independent of the frequency, and this phase compensation circuit is capable of shifting only the phase. Thus, the phase versus frequency characteristic indicated by the curve I in FIG. 6 can be obtained according to this phase compensation circuit. In addition, it is possible to vary the phase versus frequency characteristic by varying the resistances of the variable resistors $VR_1$ and $VR_2$. The operational amplifier 27 may be coupled in a stage preceding the operational amplifier 26, instead of coupling in the stage subsequent to the operational amplifier 26 as shown in FIG. 10.

Figure 11:
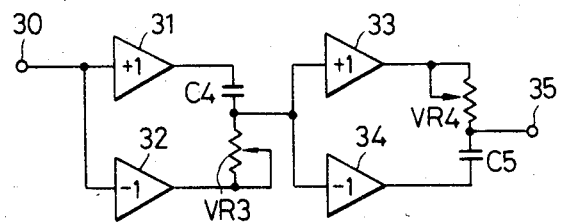
FIG. 11 is a circuit diagram showing a third embodiment of a phase compensation circuit in the recording apparatus according to the present invention.

Next, description will be given with respect to a third embodiment of the phase compensation circuit 18, by referring to FIG. 11. In FIG. 11, the digital signals applied to an input terminal 30, are supplied to a non-inverting amplifier 31 and to an inverting amplifier 32. An output of the non-inverting amplifier 31 is supplied to one end of a capacitor $C_4$, and an output of the inverting amplifier 32 is supplied to one end of a variable resistor $VR_3$. The other end of the capacitor $C_4$ is connected to the other end of the variable resistor $VR_3$. Thus, the digital signals applied to the input terminal 30, are obtained through a connection point between the capacitor $C_4$ and the variable resistor $VR_3$, and supplied to a non-inverting amplifier 33 and to an inverting amplifier 34. An output of the non-inverting amplifier 33 is coupled to an output of the inverting amplifier 34, through a circuit which comprises a series connection of a variable resistor $VR_4$ and a capacitor $C_5$. Accordingly, the output signals of the amplifiers 33 and 34 are mixed in the circuit which comprises the variable resistor $VR_4$ and the capacitor $C_5$, and an output signal is produced from a connection point between the variable resistor $VR_4$ and the capacitor $C_5$ and obtained through an output terminal 35.

According to the present embodiment shown in FIG. 11, the phase-advance characteristic which is obtained, is similar to the phase-advance characteristics obtained in the phase compensation circuits shown in FIGS. 5 and 10. Therefore, it is possible to carry out the recording so that, the recording solitary waveforms such as the one shown in FIG. 3A can be reproduced as solitary waveforms such as the one shown in FIG. 9A when the recording tracks are scanned in a direction opposite to the direction in which the tape traveled upon recording.

Figure 12:
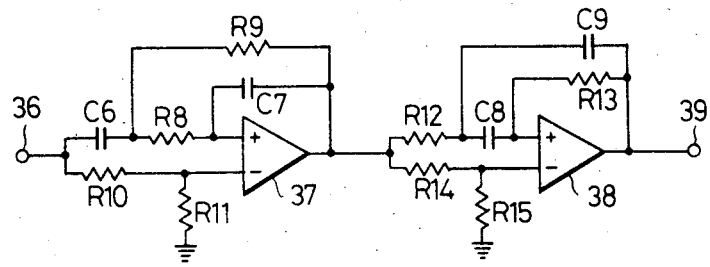
FIG. 12 is a circuit diagram showing a fourth embodiment of a phase compensation circuit in the recording apparatus according to the present invention.

Next, description will be given with respect to a fourth embodiment of the phase compensation circuit 18, by referring to FIG. 12. In FIG. 12, an input terminal 36 is coupled to a non-inverting input terminal of an operational amplifier 37, through a series connection of a capacitor $C_6$ and a resistor $R_8$. The input terminal 36 is also coupled to an inverting input terminal of the operational amplifier 37, through a voltage divider which comprises a resistors $R_{10}$ and $R_{11}$. An output of the operational amplifier 37 is coupled to the non-inverting input terminal thereof, through a capacitor $C_7$. The output of the operational amplifier 37 is also coupled to a connection point between the capacitor $C_6$ and the resistor $R_8$. The output of the operational amplifier 37 is further coupled to a non-inverting input terminal of an operational amplifier 38, through a series connection of a resistor $R_{12}$ and a capacitor $C_8$, and also to an inverting input terminal of the operational amplifier 38 through a voltage divider which comprises resistors $R_{14}$ and $R_{15}$. An output of the operational amplifier 38 is coupled to the non-inverting input terminal thereof, through a resistor $R_{13}$. The output of the operational amplifier is further coupled to a connection point between the resistor $R_{12}$ and the capacitor $C_8$, and to an output terminal 39.

While the phase compensation circuit shown in FIG. 10 was constituted by a first order all-pass circuit, the present embodiment of the phase compensation circuit shown in FIG. 12 is constituted by a second order all-pass circuit. However, the amplitude versus frequency characteristic is constant and independent of the frequency in the present embodiment, similarly as in the case of the embodiments shown in FIGS. 10 and 11. Thus, a phase-advance characteristic which is similar to those of the previously described embodiments, can be obtained in the phase compensation circuit shown in FIG. 12.

The embodiments of the phase compensation circuits shown in FIGS. 11 and 12 are known. For example, the phase compensation circuit shown in FIG. 12 may be found in T. Deliyannis, "RC Active All Pass Sections", Electronics Letters, Vol. 5, No. 3, pp. 59, Feb. 6, 1969.

The phase compensation circuit 18 may also be constituted by analog shift registers such as bucket brigade devices (BBDs), and grid circuits may also be employed.

According to the present invention, the digital signals are recorded on one or a plurality of forward tracks and one or a plurality of reverse tracks thereon, so that solitary waveforms of the digital signals which are reproduced from the forward recording tracks which are scanned in a direction which is the same as the direction in which the magnetic tape travelled upon recording, have the same assymmetry of zeros or symmetry of zeros as solitary waveforms of the digital signals which are reproduced from the reverse recording tracks which are scanned in a direction which is opposite to the direction in which the magnetic tape traveled upon recording. Therefore, the present invention is not limited to the embodiment described in conjunction with FIG. 4. That is, a circuit corresponding to the phase compensation circuit 18, may be inserted in a transmission path between the input terminal 14 and the magnetic head 17.

When inserting the phase compensation circuit only in a transmission path of the digital signals which are recorded on tracks (the forward recording tracks, for example) which are scanned upon reproduction in a direction which is the same as the direction in which the magnetic tape travel upon recording, it will be necessary to provide a phase compensation circuit which has a phase-delay characteristic. In other words, the digital signals which are recorded on tracks which are scanned upon reproduction in a direction which is the same as the direction in which the magnetic tape traveled upon recording, is relatively advanced in phase with respect to the digital signals which are recorded on tracks which are scanned upon reproduction in a direction which is opposite to the direction in which the magnetic tape traveled upon recording. Because the circuit itself which gives the phase-delay characteristic is known, detailed description of such a circuit will not be given in the present specification.

A phase compensation circuit may be inserted in both the transmission paths to the magnetic heads 17 and 20, so as to carry out the recording so that the reproduced solitary waveforms have symmetry of zeros. In addition, the track pattern on the magnetic tape is not limited to the track pattern shown in FIG. 7. For example, the forward recording tracks may be formed in the upper half of the magnetic tape along the longitudinal direction of the tape, and the reverse tracks may be formed in the remaining lower half of the magnetic tape along the longitudinal direction of the tape. Moreover, the present invention can also be applied to a magnetic tape in which there are only a single forward track and a single reverse track.

Further, the present invention is not limited to these embodiments, but various variations and modifications may be made without departing from the scope of the present invention.

What is claimed is:

1. A recording apparatus for recording digital signals on one or a plurality of forward recording tracks and one or a plurality of reverse recording tracks of a magnetic tape, the digital signals being reproduced from said one or plurality of forward recording tracks when the magnetic tape travels in a direction from one end to another end thereof, the digital signals being reproduced from said one or plurality of reverse recording tracks when the magnetic tape travels in a direction from said other end to said one end thereof, said recording apparatus comprising:
   first one or a plurality of heads for making contact with the magnetic tape and for forming said one or plurality of forwarding recording tracks;
   second one or a plurality of heads for making contact with the magnetic tape and for forming said one or plurality of reverse recording tracks, both of said first and second one or plurality of heads being supplied with the digital signals which are obtained by subjecting analog information signals to a digital pulse modulation;
   means for moving the magnetic tape in a predetermined direction, said digital signals being simultaneously recorded on said one or plurality of forward recording tracks and said one or plurality of rreverse recording tracks by the respective first and second one or plurality of heads as the magnetic tape travels in said predetermined direction; and phase compensation circuit means for relatively advancing the phase of the digital signals which are recorded on first one or a plurality of recording tracks among said one or plurality of forward and reverse recording tracks with respect to the phase of the digital signals which are recorded on second one or a plurality of recording tracks among said one or plurality of forward and reverse recording tracks, so that solitary reproduced waveforms which are reproduced from said first one or plurality of recording tracks and solitary waveforms which are reproduced from said second one or plurality of recording tracks respectively have substantially the same assymmetry of zeros or the same symmetry of zeros, said first one or plurality of recording tracks being scanned upon reproduction in a direction opposite to said predetermined direction in which said magnetic tape traveled upon recording, said second one or plurality of recording tracks being scanned upon reproduction in a direction which is the same as said predetermined direction in which said magnetic tape traveled upon recording.

2. A recording apparatus as claimed in claim 1 in which said phase compensation circuit means is provided only in a transmission path of the digital signals which are to be recorded on said first one or plurality of recording tracks, said phase compensation circuit means comprising a phase compensation circuit for giving a phase advance characteristic to input digital signals thereof.

3. A recording apparatus as claimed in claim 1 in which said phase compensation circuit means comprises first and second phase compensation circuits, and first phase compensation circuit being provided in a transmission path of the digital signals which are to be recorded on said first one or plurality of recording tracks so that solitary waveforms which are reproduced from said first one or plurality of recording tracks have symmetry of zeros, said second phase compensation circuit being provided in a transmission path of the digital signals which are to be recorded on said second one or plurality of recording tracks so that solitary waveforms which are reproduced from said second one or plurality of recording tracks have symmetry of zeros.

4. A recording apparatus as claimed in claim 2 in which said phase compensation circuit means comprises an operational amplifier supplied with the digital signals to a first input terminal thereof, a feedback resistor coupled between a second input terminal of said operational amplifier and an output of said operational amplifier, and a series connected resistor and a capacitor coupled between said second input terminal of said operational amplifier and ground.

5. A recording apparatus as claimed in claim 2 in which said phase compensation circuit means comprises a first operational amplifier having first and second input terminals, a second operational amplifier having third and fourth input terminals, an input terminal applied with the digital signals which are to be recorded, and an output terminal, said first input terminal is coupled to one end of a first feedback resistor and to one end of a first resistor, said second input terminal is coupled to one end of a first capacitor and to one end of a second resistor which has its other end grounded, said third input terminal is coupled to one end of a second feedback resistor and to one end of a third resistor, said fourth input terminal is coupled to one end of a fourth resistor and to one end of a second capacitor which has the other end grounded, said digital signals applied to said input terminal are supplied to the other end of said first resistor and to the other end of said first capacitor or supplied to the other ends of said third and fourth resistors, and said output terminal produces the output of said first or second operational amplifier as the digital signals which are to be recorded.

* * * * *